United States Patent [19]
Greenberg et al.

[11] 3,993,845
[45] Nov. 23, 1976

[54] THIN FILMS CONTAINING METALLIC COPPER AND SILVER BY REPLACEMENT WITHOUT SUBSEQUENT ACCELERATED OXIDATION

[75] Inventors: Charles B. Greenberg, Murrysville; Peter P. Harmon, North Huntington, both of Pa.

[73] Assignee: PPG Industries, Inc., Pittsburgh, Pa.

[22] Filed: Apr. 17, 1975

[21] Appl. No.: 569,334

Related U.S. Application Data

[63] Continuation-in-part of Ser. No. 384,763, July 30, 1973, Pat. No. 3,920,864.

[52] U.S. Cl. .............................. 428/433; 29/195; 427/169; 427/305; 427/306; 427/404; 428/434; 428/458
[51] Int. Cl.² ................ B32B 15/04; B32B 15/08; B05D 1/36
[58] Field of Search ........... 427/305, 306, 165, 333, 427/304, 404; 204/43 R, 45 R, 46 R; 428/433, 434, 412, 458; 29/195 G, 195 P, 199

[56] References Cited
UNITED STATES PATENTS

| 3,457,138 | 7/1969 | Miller ................................ 428/134 |
| 3,476,530 | 11/1969 | Ehrreich et al. .................... 427/305 |
| 3,772,056 | 11/1973 | Polichette et al. .................. 427/304 |
| 3,920,864 | 11/1975 | Greenburg et al. ................. 427/169 |

*Primary Examiner*—Cameron K. Weiffenbach
*Assistant Examiner*—R. Eugene Varndell, Jr.
*Attorney, Agent, or Firm*—Donna L. Seidel; E. Kears Pollock

[57] ABSTRACT

Novel copper-silver metallic films are prepared on transparent articles by chemical replacement of silver for copper according to the method of the present invention. A transparent article is coated with a metallic copper film by a conventional method of deposition. The copper coated article is then contacted by a solution comprising a silver salt, ammonia and a complexing agent which promotes replacement but which does not accelerate the oxidation of residual metallic copper in the film. Replacement of copper by silver occurs with the film retaining its reflective metallic character.

17 Claims, No Drawings

THIN FILMS CONTAINING METALLIC COPPER AND SILVER BY REPLACEMENT WITHOUT SUBSEQUENT ACCELERATED OXIDATION

CROSS REFERENCE TO RELATED APPLICATIONS

This application is a continuation-in-part of copending application Ser. No. 384,763 filed by the present applicants on July 30, 1973 now U.S. Pat. No. 3,920,864.

BACKGROUND OF THE INVENTION

1. Field of the Invention

This invention relates broadly to methods of coating transparent articles. In particular, this invention relates to the method of producing copper-silver films by chemical replacement by silver of copper in a conventionally deposited copper film.

2. Description of the Prior Art

Transparent articles bearing a transparent metal film have been produced by various well-known electroless or wet chemical coating or plating tehcniques. These techniques generally involve the contacting of the article to be coated with suitable solutions to deposit a metal film thereon by reducing the metal from a metal salt in the solution.

Autocatalytic coating techniques are known wherein a reducing agent such as an alkali metal hypophosphite or formaldehyde is present in a single solution with the metal salt. Such a solution is not usually susceptible to rapid reaction until it is placed in contact with a catalytic or sensitized surface. Autocatalytic techniques for the deposition of cobalt are described in U.S. Pat. No. 2,532,283 and 2,532,284, to Brenner and Riddell. Other techniques of this type are described in patents such as U.S. Pat. No. 2,956,900 to Carlson et al., relating to the deposition of nickel.

Exhaustive electroless coating techniques are also known. In these techniques the reduction reaction will proceed rapidly once the reducing agent is present together with the metal salt-containing solution. For this reason, such techniques usually require applying separate solutions of these reactants substantially simultaneously to the substrate to be coated. Among such techniques are those wherein a boron-containing reducing agent is employed, such as described in U.S. Pat. No. 3,671,291 to Miller and Cavitt for the deposition of iron, nickel and cobalt.

The reflectance and transmittance characteristics of glass may also be modified by introducing metals into the surface of the glass itself. Typical staining techniques for accomplishing this result are described in U.S. Pat. No. 2,701,215 to Kroecl and U.S. Pat. No. 3,079,264 to Grego et al. Such techniques are not, however, coating techniques and do not result in a metal film on the surface of the substrate. Nor are such techniques replacement reactions since there is no metal film involved to be replaced.

While the practice of plating bulk metals presents substantially different problems from the coating of transparent articles with thin, transparent reflective films, immersion plating techniques for such purposes are well known. In the METAL FINISHING GUIDEBOOK for 1965, at page 407, there is described a method for plating silver over copper metal. The method comprises contacting a copper article with a solution containing 1 ounce-per-gallon of silver nitrate, 10 ounces-per-gallon ammonia, and fourteen ounces-per-gallon of sodium thiosulfate.

The preparation of thin, transparent films on transparent substrates, particularly on large sheets of glass for architectural use, presents particular problems which are not present in the coating of opaque articles, particularly opaque metallic articles. In the making of large, transparent, coated articles for architectural use, it is of extreme importance that films of uniform thickness, transmittance and reflectivity be produced in order for the articles to have a uniform aesthetic appearance. Films of the requisite uniformity have been prepared comprising various metals including iron, cobalt, nickel, copper, silver and mixtures thereof, by direct deposition onto the substrate utilizing electroless coating techniques.

Patented electroless coating techniques have been employed successfully in producing highly uniform films having an aesthetically pleasing appearance and a high reflectivity for energy in the infrared range. Articles coated in accordance with these techniques are used in buildings to provide attractive windows or curtain walls which effectively reflect solar energy thus minimizing the load imposed on air conditioning systems servicing these buildings.

Commercial architectural products such as described above have been produced according to the teachings of U.S. Pat. No. 3,457,138 to Miller, which describes a method of making highly efficient infrared reflective films by the direct deposition of a copper film over a directly-deposited silver film. Such films are rich in copper and have a pleasing pink appearance.

A method of producing articles having other desirable color characteristics and solar energy control capabilities is disclosed in the copending application of Charles B. Greenberg and Peter P. Harmon, U.S. Ser. No. 384,763 now U.S. Pat. No. 3,920,864. This method requires a thiosulfate complexing agent and provides a means for producing films having lower reflectivity and an aesthetically desirable brown-gray appearance. Such films, however, are not essentially metallic, rather having most of the copper in an oxidized state as an oxide or perhaps a sulfide.

SUMMARY OF THE INVENTION

Transparent films comprising metallic copper and silver are prepared by depositing a copper film onto a transparent substrate by any conventional means and then contacting the copper film with a silver-containing solution, resulting in a copper-silver coated article, the properties of which differ from the properties of copper, silver, or copper-silver films of the prior art.

A thin metallic film of copper is deposited onto a non-metallic substrate by a known direct-deposition technique. The conventionally coated article is then treated with a silver-containing replacement solution according to the method of the present invention. Silver from the solution replaces copper in the film, resulting in a film comprising copper and silver. While some oxidation of the residual copper is likely, the rate of oxidation is not accelerated by thiosulfate in the method of the present invention, and the extent of oxidation is therefore insufficient to perceptably alter the appearance of the coated article. Large sheets of glass coated according to the method of this invention may be used as windows to control solar energy.

In the practice of this invention, the surface of a substrate to be coated is first cleaned by conventional cleaning procedures. The surface is then prepared for coating and coated with a thin copper film by vapor deposition, sputtering, electrolytic deposition or electroless deposition. A preferred method for applying a thin copper film is electroless deposition, particularly the method of electroless deposition of copper over a flash silver film as taught by U.S. Pat. No. 3,457,138 to Miller.

The copper coated article is then contacted with an aqueous solution of an ammoniacal silver salt and a complexing agent. Such complexing agents as ethylenediamine, ethylenediamine tetraacetic acid, disodium ethylenediaminetetraacetate, sodium oxalate and ammonium hydroxide may be employed. However, thiosulfate complexing agents are not employed since thiosulfate has been found to accelerate the subsequent oxidation of residual copper in the film, resulting in a copper-silver film, wherein the copper is not substantially metallic copper but is present rather as the oxide or perhaps sulfide. Use of a complexing agent such as those previously described and the like results in the occurrence of a replacement reaction without subsequent accelerated oxidation of residual copper in the film.

During the brief period of time in which the replacement solution is maintained in contact with the copper film, silver from the solution displaces a portion of the copper in the film, resulting in a metallic copper-silver film. The resulting copper-silver film does not subsequently decrease in reflectivity and acquire the brown-gray color characteristic of similar films wherein the residual metallic copper is subsequently oxidized. Instead, the metallic copper-silver film prepared according to the method of the present invention retains its metallic character and reflectivity. The appearance of the coated surface is silvery gray, indicating high silver content. The appearance of the uncoated surface of a transparent non-metallic substrate remains pink as would be expected if the film were to remain essentially metallic copper near the surface of the substrate.

DESCRIPTION OF THE PREFERRED EMBODIMENTS

Large sheets or plates of flat glass are coated according to this invention for use as windows. Sheets of clear, soda-lime-silica glass, each having a thickness of about 7/32 inch (0.56 cm) and measuring about 4 feet by 6 feet (about 1.2 by 2 meters) are prepared for coating. A glass sheet is placed in a substantially horizontal conveyor and is conveyed to a cleaning section of a continuous coating line. In this section a plurality of rotating discs or blocks gently abrade the upper surface of the sheet, preferably with an aqueous slurry of a commerical glass cleaning compound. This loosens any dirt adhering to the glass. This operation, called a blocking operation, is preferably carried out using felt blocks with each block rotated continuously at a rate of about 200 to 600 revolutions per minute. The blocks are preferably oscillated over a short amplitude in a direction transverse to the advancing sheet of glass to insure that the entire upper surface of the sheet is blocked. After blocking the sheet advances beneath a plurality of rotary cup brushes that wash the surface with tap water. The brushes are rotated and oscillated in a manner similar to the rotation and oscillation of the blocks. Each sheet then advances beneath a transverse brush or squeegee that is employed to sweep away the wash water used to clean the sheet. A continuous line apparatus, such as shown in U.S. Pat. No. 3,723,155 to Greenberg and Crissman, may be effectively employed in the practice of this invention.

After cleaning, each clean glass sheet is contacted with a dilute solution of a sensitizing agent for a short time, usually under ambient conditions at a temperature of from 50° to 95° F. The glass sheet is then rinsed with water, preferably a relatively pure water, such as deionized water or demineralized water. The sensitizing agent employed is preferably a tin salt. Any of a variety of salts may be employed in an aqueous solution to carry out the sensitizing step. For example, the following salts may be employed: stannous cholride, stannous bromide, stannous iodide, stannous sulfate or the like. Stannous chloride is a preferred sensitizing agent.

After the glass sheet has been sensitized, it is preferably activated. This activation may be carried out according to the teachings of Bergstrom, U.S. Pat. No. 2,702,253, using a palladium salt.

The glass sheet is then preferably treated by contacting the glass with an aqueous, ammoniacal silvering solution. The glass is treated by contacting it with an aqueous, ammoniacal silvering solution prepared by intermixing two solutions prior to the time of contact and contacting the glass surface with this mixture. The two solutions, which are intermixed, are: a first solution containing an ammoniacal silver salt and a second solution containing a reducing agent. This contacting step results in a deposition of an extremely thin silver film which is referred to as a flash silver film. The thickness of this silver silm is sufficient to reduce the visible light transmittance of the coated article to 70 to 85 percent, and preferably to within the range of 78 to 82 percent, from the visible light transmittance of the uncoated glass, which is about 88 percent. This contracting step is preferably carried out at ambient temperature.

Any convenient water-soluble or water-dispersible silver salt can be used in forming the silvering solution. It is, however, preferable to employ an aqueous solution containing a silver salt such as silver sulfate, silver nitrate, silver chloride, or the like. Silver nitrate is the silver salt that is preferred.

The ammoniacal silver salt solution is preferably prepared by dissolving silver nitrate in demineralized or otherwise pure water and then adding an aqueous solution of ammonium hydroxide thereto. The aqueous silvering solution can contain from about 0.0001 to about 10.0 percent by weight of a selected ammoniacal complex silver salt, such as ammoniacal silver nitrate. Usually the concentration of the silver salt ranges from 0.001 to 1.0 percent with a concentration of from 0.01 to 0.1 percent preferred. The silvering solution may be stabilized according to the teachings of U.S. Pat. No. 3,723,138 if it is desired to extend the stable life of the silvering solution.

The silver reducing agent is provided in the reducing agent component of the intermixed solution. The reducing agent may be formaldehyde, dextrose, and invert sugar or the like. The reducing agent is present in the solution in an amount from about 0.001 to 25 percent by weight. Usually, the weight concentration of the reducing agent is within the range of from 0.005 to 0.5 percent by weight, and preferably it is present in an amount from 0.008 to 1.0 percent by weight. Following the deposition of the metallic silver film in the preferred embodiment, the glass is coated with copper. The activated and treated glass surface is contacted with an aqueous, alkaline, copper-coating solution containing a water-soluble or water-dispersible copper salt, a reducing agent, a complexing agent, a pH control agent and the salt of a metal selected from nickel or cobalt. The copper salt which is employed is preferably copper sulfate, though other copper salts may be employed. The reducing agent for the copper is preferably formaldehyde, though other reducing agents may be employed. The preferred complexer is a tartrate salt, such as sodium potassium tartrate. Other complexers, such as, for example, ethylenediamine tetraacetic acid, may be employed. A preferred pH control agent is sodium hydroxide, though other alkalis may be employed.

The copper is applied to the glass by spraying, flowing or otherwise causing the copper-coating solution to contact the treated glass surface. Preferably the copper-coating step is carried out at ambient temperature. Contact time ranges from 30 seconds to about 5 minutes and is sufficient to deposit a thin, transparent copper film on the glass. The silvering and coppering steps described herein as part of the preferred embodiment of this invention are substantially those taught in U.S. Pat. No. 3,457,138 to R. G. Miller. The copper film on the glass has a pink appearance from both the coated and uncoated surfaces of the substrate. The luminous transmittance of the coated article may be varied according to the silver and copper contact times.

The copper-coated surface of the glass sheet is then contacted with a replacement solution containing an ammoniacal silver salt and a complexing agent. On the basis of one liter of water, the replacement solution typically contains 0.5 to 5 grams of silver nitrate and at least about 0.5 cc. of ammonium hydroxide (28 to 30 percent assay). The amount of complexing agent will vary according to the choice of complexing agent. If excess ammonium hydroxide is to act as complexing agent, a total concentration of at least about 2 cc. per liter is required. Other preferred complexing agents include 0.5 to 25 grams per liter of sodium oxalate or 1 to 8 grams per liter of disodium ethylenediamine tetraacetate. As much as 100 to 200 cc. per liter excess of ammonium hydroxide does not hinder the replacement reaction.

The replacement solution is maintained in contact with the film at room temperature for a period of from less than one minute to about five minutes depending on the complexing agent employed, the solution concentration and the desired degree of replacement. The replacement reaction is observed by a change in the color of the coated article and a decrease in its luminous transmittance. The replacement solution is then rinsed from the coated surface with water and the resulting metallic copper-silver film is dried with air.

The copper-silver coated article has a luminous reflectance from its coated surface of about 40 to 50 percent and from its uncoated surface of about 30 to 40 percent using an illuminant A source. The luminous transmittance is decreased. The article appears silvery-gray when viewed toward the coated surface, indicating a silver-rich film. However, the article appears pink in appearance when viewed toward the uncoated side, indicating that a portion of the film near the surface of the substrate remains essentially metallic copper.

The present invention will be further understood from the description of the specific example which follow:

EXAMPLE I

Sheets of clear soda-lime-silica glass are cleaned, sensitized, activated, pre-treated with silver and coated with copper as described above to yield sheets of glass having a highly reflective pink appearance when viewed toward either surface and a luminous transmittance of 30 percent.

The copper-coated surface is then contacted at ambient temperature with a replacement solution comprising water, 1.0 gram per liter silver nitrate, 1 cc. per liter of ammonium hydroxide (28 to 30 percent assay) and 3.0 grams per liter disodium ethylenediamine tetraacetate.

After 20 seconds, the replacement solution is rinsed away and the coated sheet dried with air. The appearance of the resulting coated article is silvery-gray from the coated side, but remains pink from the uncoated side. The luminous transmittance is decreased to about 22 percent.

EXAMPLE II

Sheets of clear soda-lime-silica glass are coated with copper as in Example I resulting in reflective coated sheets with luminous transmittance of 20 percent. The sheets are then treated with a replacement solution comprising water, 1.0 gram per liter silver nitrate, 1 cc. per liter of ammonium hydroxide (28 to 30 percent assay), and 1.6 gram per liter of sodium oxalate.

Replacement of copper by silver is observed. After 3 minutes, the replacement solution is rinsed from the coated sheet. The resultant copper-silver coated sheet appears silver-gray when viewed toward the coated side and pink when viewed toward the uncoated side in normal fluorescent lighting. Both the coated and uncoated surfaces are highly reflective and the luminous transmittance is decreased to 6 percent.

EXAMPLE III

Glass sheets are prepared and coated as in Examples I and II. The resultant copper-coated sheets have a luminous transmittance of 25 percent. The coated sheets are then treated with a replacement solution comprising 1.0 g./l. of silver nitrate and ammonium hydroxide in excess of the amount used in Examples I and II, which acts as a complexing agent both for the silver in the solution and for the replacement reaction. An additional 11.0 cc./liter is sufficient excess to act as a complexing agent and permit the replacement reaction to occur, resulting in a metallic copper-silver coated sheet as in Examples I and II. After one minute of contact, the replacement solution is rinsed from the coated sheet. The luminous transmittance of the resulting copper-silver coated sheet is 12 percent.

The above Examples are offered in illustration and are not intended to limit the scope of applicant's claimed invention. For example, substrates other than glass, such as polymeric materials, may be coated according to the method of this invention. Other complexing agents may be employed so long as the complexing agent does not accelerate the oxidation of metallic copper remaining in the film. The replacement reaction need not occur at room temperature; a temperature range of 20° to 90° C. being considered feasible and resulting in longer or shorter replacement times. It will be evident to those skilled in the art that other variations and modifications may be made to the disclosed replacement method of preparing copper-silver film without departing from the spirit of this invention.

We claim:
1. A method of preparing a metallic copper-silver film on a non-metallic transparent substrate comprising the steps of:
   a. sensitizing a surface of the substrate;
   b. applying a copper film to the sensitized surface; and
   c. contacting said copper film with a solution containing an ammoniacal silver salt and a complexing agent from the group consisting of ethylenediamine, ethylenediamine tetraacetic acid, disodium ethylenediamine tetraacetate, tetrasodium ethylenediamine tetraacetate, ethylenediamine mono-d-tartrate, sodium oxalate and ammonium hydroxide.

2. The method according to claim 1 wherein the step of applying a copper film is accomplished by electroless deposition.

3. The method according to claim 2 wherein the electroless deposition of the copper film is preceded by the step of applying a thin film of silver to the surface of the substrate to be coated.

4. The method according to claim 1 wherein the copper film is contacted with an alkaline aqueous solution comprising a silver salt and a complexing agent selected from the group consisting of sodium oxalate, disodium ethylenediamine tetraacetate and excess ammonium hydroxide.

5. The method according to claim 4 wherein the complexing agent is ammonium hydroxide, and said alkaline aqueous solution comprises:
   a. from about 0.5 to about 5.0 grams per liter silver nitrate; and
   b. from at least about 2 cc. per liter to as much as about 200 cc. per liter ammonium hydroxide (28 to 30 percent assay).

6. The method according to claim 4 wherein said alkaline aqueous solution comprises:
   a. from about 0.5 to about 5.0 grams per liter silver nitrate;
   b. from about 0.5 to about 100 cc. per liter ammonium hydroxide (28 to 30 percent assay); and
   c. from about 1 to about 8 grams per liter disodium ethylenediamine tetraacetate.

7. The method according to claim 4 wherein said alkaline aqueous solution comprises:
   a. from about 0.5 to about 5.0 grams per liter silver nitrate;
   b. from about 0.5 to about 100 cc. per liter ammonium hydroxide (28 to 30 percent assay); and
   c. from about 0.5 to about 25 grams per liter sodium oxalate.

8. A coated transparent article prepared according to the method of claim 1.

9. A method of preparing a coated glass sheet comprising the steps of:
   a. sensitizing a surface of the glass sheet;
   b. applying a copper film to the sensitized surface; and
   c. contacting the copper film with an aqueous solution comprising water, an ammoniacal silver salt and a complexing agent selected from the group consisting of ethylenediamine, disodium ethylenediamine tetraacetate, tetrasodium ethylenediamine tetraacetate, ethylenediamine mono-d-tartrate, sodium oxalate and ammonium hydroxide.

10. The method according to claim 9 wherein the step of applying a copper film is accomplished by electroless deposition of copper preceded by the electroless deposition of a thin silver film.

11. The method according to claim 9 wherein the step of contacting the copper film is carried out with a solution comprising:
   a. water;
   b. about 0.5 to about 5.0 grams per liter of silver nitrate;
   c. about 0.5 to about 100 cc. per liter ammonium hydroxide (28 to 30 percent assay); and
   d. the selected complexing agent.

12. The method according to claim 11 wherein the complexing agent is ammonium hydroxide, the total concentration of ammonium hydroxide (28 to 30 percent assay) in the solution being from at least about 2 cc. per liter to as much as about 200 cc. per liter.

13. The method according to claim 11 wherein the complexing agent is from about 0.5 to about 25 grams per liter sodium oxalate.

14. The method according to claim 10 wherein the complexing agent is from about 1 to about 8 grams per liter disodium ethylenediamine tetraacetate.

15. The method according to claim 9 wherein the glass sheet is a clear, transparent glass sheet.

16. A coated glass sheet prepared according to the method of claim 15.

17. A coated glass sheet prepared according to the method of claim 10.

* * * * *

UNITED STATES PATENT AND TRADEMARK OFFICE
CERTIFICATE OF CORRECTION

PATENT NO. : 3,993,845
DATED : November 23, 1976
INVENTOR(S) : Charles B. Greenberg and Peter P. Harmon It is certified that error appears in the above-identified patent and that said Letters Patent are hereby corrected as shown below:

Column 7, Claim 1, line 12, please add --selected-- after "agent".

Column 8, Claim 14, line 41, please change "10" to --9--.

Column 8, Claim 17, line 49, please change "10" to --9--.

Signed and Sealed this

Eighth Day of March 1977

[SEAL]

Attest:

RUTH C. MASON
*Attesting Officer*

C. MARSHALL DANN
*Commissioner of Patents and Trademarks*